United States Patent [19]

Rule

[11] Patent Number: 6,103,774

[45] Date of Patent: *Aug. 15, 2000

[54] PROCESS FOR REMOVING CONTAMINANTS FROM POLYESTERS AND CONTROLLING POLYMER MOLECULAR WEIGHT

[75] Inventor: Mark Rule, Atlanta, Ga.

[73] Assignee: The Coca-Cola Company, Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,565

[22] Filed: Apr. 2, 1997

[51] Int. Cl.[7] .................................................... C08J 11/04
[52] U.S. Cl. ............................................. 521/48; 528/481
[58] Field of Search .................... 521/48, 48.5; 528/495, 528/496, 499, 500, 481

[56] References Cited

U.S. PATENT DOCUMENTS

| | | | |
|---|---|---|---|
| 3,767,601 | 10/1973 | Knox . | |
| 3,804,811 | 4/1974 | Rose et al. . | |
| 3,928,253 | 12/1975 | Thornton | 521/48.5 |
| 3,953,401 | 4/1976 | Gabler | 528/496 |
| 4,118,582 | 10/1978 | Walker | 560/96 |
| 4,360,661 | 11/1982 | Horlbeck | 521/48.5 |
| 5,049,647 | 9/1991 | Al-Ghatta | 528/500 |
| 5,298,530 | 3/1994 | Gamble | 521/48 |
| 5,380,793 | 1/1995 | Pepper | 528/495 |
| 5,393,863 | 2/1995 | Yau | 528/495 |
| 5,393,871 | 2/1995 | Yau | 528/495 |
| 5,395,858 | 3/1995 | Schwartz | 521/48 |
| 5,532,335 | 7/1996 | Kimball | 528/496 |
| 5,554,657 | 9/1996 | Brownscombe | 521/48 |
| 5,576,456 | 11/1996 | Gamble | 528/496 |
| 5,580,905 | 12/1996 | Schwartz | 521/48 |
| 5,602,187 | 2/1997 | West | 528/495 |
| 5,635,584 | 6/1997 | Ekart | 521/48 |
| 5,672,780 | 9/1997 | Gamble | 568/871 |
| 5,770,778 | 6/1998 | Naujokas | 568/872 |
| 5,780,520 | 7/1998 | Reeves | 521/48.5 |

FOREIGN PATENT DOCUMENTS

| | | |
|---|---|---|
| 300981A1 | 1/1989 | European Pat. Off. . |
| 0376119A | 7/1990 | European Pat. Off. . |
| 1563765 | 4/1969 | France . |
| WO96/24630 | 8/1996 | WIPO . |

OTHER PUBLICATIONS

H. Meierkord, "Recycling–Moeglichkeiten Fuer Polyester", vol. 43, No. 6, Jun. 1, 1993, pp. 524–526.

P. Muhs et al., "Pet–Flaschen Durch Depolymerisation Rezyklieren*", Kunststoffe, vol. 82, No. 4, Apr. 1, 1992 pp. 289–292.

*Primary Examiner*—Paul R. Michl
*Attorney, Agent, or Firm*—Finnegan, Henderson, Farabow, Garrett & Dunner, L.L.P.

[57] ABSTRACT

The present invention relates to a process for removing contaminants, which comprises removing contaminants from a contaminant-containing polyester material at a temperature of at least 150° C. in the presence of an equilibrium amount of a polyester reversible side-product.

34 Claims, 2 Drawing Sheets

PROCESS FOR REMOVING CONTAMINANTS FROM POLYESTERS AND CONTROLLING POLYMER MOLECULAR WEIGHT

BACKGROUND OF THE INVENTION

1. Field of the Invention

The present invention relates to a process for removing contaminants from polyesters, especially post-consumer polyesters.

2. Description of the Related Arts

The recycling of plastics has become an important concern over the last twenty years. The ability to recapture plastics after consumer use and turn the material into another useful article saves landfill space and conserves resources.

Polyesters such as polyethylene terephthalate, or PET, have found extensive commercial use. One such use is in the beverage container industry. However, unlike glass bottles which can be easily cleaned and refilled, plastic containers can be quite difficult to clean. For example, special sensors should be used for detecting the presence of contaminants. In addition, due to flavor absorption into the plastic, the container must be used for holding the same product when refilled. Because of these and other difficulties, plastic containers are generally recycled instead of refilled. Recycling generally involves shredding the plastic bottle and removing contaminants therefrom. The shredded plastic or flakes can then be remelted and extruded into the shape of a new container.

One of the known contaminant-removal processes involves subjecting the polyester material to a high temperature inert gas stream whereby the contaminants contained within the material are effectively removed by the gas stream. But, this technique suffers from a drawback in that the molecular weight of the polymer is increased by such a treatment. In addition, the molecular weight increase varies with respect to the polymer particle size. Therefore, the molecular weight increase will not be uniform or consistent, thereby decreasing the quality of the polymer. This increase and broadening in the average molecular weight thus complicates the recycling process.

One possible method for avoiding an increase in average molecular weight while removing contaminants is to depolymerize the plastic by the use of superheated steam and then carrying out solid state polymerization to return the polymer to the original molecular weight. The steam treatment will also remove the contaminants. However, such a method is complicated in that a molecular weight decrease and increase step are both required. This is especially problematic from the viewpoint of process control since the molecular weight of the solid polymer can not be directly measured during the treatment. Moreover, variations in particle size distribution and resin composition among different manufacturers' products will require different process treatment conditions. Such conditions must be determined through essentially trial and error. Correspondingly, if the product is of unknown origin, or if it is a mixture of polymers, it is difficult, if not impossible, to correctly predict and carry out the correct temperatures and residence times so as to return the polymer to its original molecular weight. Thus, this method is not convenient and is difficult to control.

Accordingly, the prior art has not yet developed a convenient method for removing contaminants from polyesters without increasing the average molecular weight of the polymer.

SUMMARY OF THE INVENTION

An object of the present invention is to provide a process for removing contaminants from polyesters without increasing the molecular weight of the polyesters.

Another object of the present invention is to provide a simple process for removing contaminants from polyesters.

A further object of the present invention is to provide an efficient process for removing the contaminants from polyesters.

An additional object of the present invention is to control the average molecular weight of polyesters.

These and other objects of the present invention have been achieved by a process which comprises removing contaminants from a contaminant-containing polyester material at a temperature of at least 150° C. in the presence of an equilibrium amount of a polyester reversible side-product.

These objects are also achieved by a process for removing contaminants, which comprises (a) adding an effective molecular weight controlling amount of a polyester reversible side-product to a vessel which contains contaminated polyester material, and (b) passing an inert fluid over said contaminated polyester material contained in said vessel at a temperature of from 150 to 250° C. to thereby remove contaminants from said polyester material.

DETAILED DESCRIPTION OF THE INVENTION

The end groups of polyesters become reactive at temperatures above 150° C. via their terminal groups and, due to the inherent presence of a catalyst, form condensed polymer chains and side-products. For PET, this reaction can be expressed as follows:

The polyester reversible side-product, here ethylene glycol, is produced in a 1:1 stoichiometric ratio with the condensed polymer. However, during the prior art contaminant removal treatment wherein the polyester material is heated and inert gas passed thereover, the polyester reversible side-products like ethylene glycol tend to be removed from the polymer along with the contaminants. This removal of the polyester reversible side-product shifts the equilibrium toward the production of more condensed polymers and polyester reversible side-product. Furthermore, because the polyester reversible side-product is being removed from the system, the corresponding condensed polymer chain cannot revert back to two separate polymer chains. The combination of these mechanisms serves to decrease the number of polymer chains which correspondingly increases the average molecular weight of the polymer.

The present invention serves to prevent and/or control this equilibrium shift by supplying a polyester reversible side-product during the contaminant removal step.

The term "a polyester reversible side-product" as used in this application means, unless otherwise indicated, any product formed as a result of a reversible solid state chain condensation reaction between terminal ends of polyester chains. The polyester reversible side-product provided in the process of the present invention need not be the same as the polyester reversible side-product actually present in the contaminated polyester material. Indeed, in some embodiments it is preferred to provide a different polyester reversible side-product than that contained in the contaminated polyester material since end group replacement will gradually result. For example, some polymers contain terminal carboxyl groups which render the polymer susceptible to hydrolysis. By using ethylene glycol as the added polyester reversible side-product, the carboxyl terminated chains are somewhat replaced with hydroxyl terminated chains, thereby increasing the hydrolysis resistance. Nonetheless, typically the polyester reversible side-product added is the same as the majority (typically >50%) polyester reversible side-product contained in the contaminated polyester.

Polyester reversible side-products include diols having 2 to 6 carbon atoms, methanol, water, and diethylene glycol. Preferably the polyester reversible side-product used in the present invention is ethylene glycol, water, or 1,4-butane diol. Combinations of polyester reversible side-products can also be used if desired. The polyester reversible side-products do not include materials that are produced from an irreversible reaction such as acetaldehyde, which is formed from vinyl ester end groups. Thus, in the present invention, the polyester reversible side product is capable of a reversible reaction.

The term "equilibrium amount of a polyester side product", which is sometimes referred to as simply "equilibrium amount" means that the atmosphere surrounding the contaminated polyester material contains an amount of polyester reversible side-product corresponding to the equilibrium amount of polyester reversible side-product contained in a polyester material having the desired molecular weight. That is, the equilibrium amount of polyester reversible side-product present in a polyester material, which is a function of molecular weight, is provided in the process of the present invention so that the contaminated polyester material is treated in the presence thereof. By providing the desired equilibrium amount of polyester reversible side-product during the contaminant removal step, the molecular weight of the polyester material can be controlled.

The polyester reversible side-product atmosphere provided around the contaminated polyester material can be either gaseous or liquid. The atmosphere is gaseous if no inert fluid is used to assist in contaminant removal. In this embodiment, the process preferably proceeds under vacuum or reduced pressure. The polyester reversible side-product is also in a gaseous phase if combined with an inert gas. The pressure used in this embodiment can range from vacuum or reduced pressure to superatmospheric. However, the pressure is preferably ambient pressure or about one atmosphere. If the polyester reversible side-product is combined with an inert liquid (e.g., biphenyl, diphenylether) then the atmosphere is preferably liquid. That is, the polyester reversible side-product is used in the liquid state.

In one embodiment of the present invention, the polyester reversible side-product is provided in an amount that is substantially equal to the initial equilibrium amount of polyester reversible side-product present in the contaminated polyester. "Substantially equal" in this context means essentially within the range of experimental error and is typically no more than +/−0.02 IV units (Intrinsic Viscosity units). The concentration of polyester reversible side-product within and without of the polyester material is, thus, the same. No concentration gradient exists from the interior of the material to the external atmosphere that is provided. In this way, the amount of polyester reversible side-product in the polyester material remains the same (desorbtion rate is equal to absorption rate) and the molecular weight of the polyester is held constant.

In another embodiment, the average molecular weight is increased or decreased to a preselected average molecular weight by selecting a corresponding equilibrium amount of polyester reversible side-product. By varying the equilibrium amount from the actual amount of polyester reversible side-products contained in the contaminated polyester material, the equilibrium of polymerized (condensed chains) and depolymerized (separate chains) products in the polyester material can be correspondingly varied. That is, the initial average molecular weight in the contaminated polyester can be forced to a new average molecular weight corresponding to the equilibrium amount of polyester reversible side-product provided. By changing the equilibrium, the amount of condensed polymer chains present is correspondingly altered, thereby controlling the average molecular weight. Preferably the average molecular weight is in the range of 0.5 to 1.2 I.V., more preferably to within the range of from 0.72 to 0.84 I.V. Typically the adjustment of the average molecular weight, either up or down, is not more than 0.15 IV, preferably not more than 0.1 IV.

If a mixture of polyester materials are used, each having a different average molecular weight, the equilibrium amount of the polyester reversible side-product may be selected such that one of the polyester materials is substantially increasing its average molecular weight while another is substantially decreasing its average molecular weight. In this way, the molecular weight distribution of the overall material is narrowed.

The desired concentration of polyester reversible side-product in the polyester, and hence the equilibrium amount provided in the process of the present invention, can be calculated for any given molecular weight or intrinsic viscosity by known means and equations. For example, regarding the concentration of ethylene glycol in PET, the equation would be as follows:

$$C_{EG} = \frac{KC_E^2}{C_I}$$

wherein $C_{EG}$ is the concentration of ethylene glycol, K is the equilibrium constant for the reaction (which is nearly 1), $C_E$ is the concentration of hydroxyethyl end groups, and $C_I$ is the concentration of internal esters. These values can all be readily derived from the Mark-Houwink relationship between molecular weight and IV for the polyester.

PET having a degree of polymerization (DP) of approximately 125 and an intrinsic viscosity (IV) of 0.72 (as measured in phenol/tetrachloroethane) at 200–220° C., has the following concentrations:

$C_I$=number of ester linkages/$10^6$ g =5208

$C_E$=number of end groups/$10^6$ g =(2×5208)/DP=83

Accordingly, the concentration of ethylene glycol can be determined from:

$$C_{EG} = \frac{KC_E^2}{C_I}$$

wherein K is essentially 1 as:

$C_{EG}=C_E^2/C_I=1.33$ mol/$10^6$ g

The amount of ethylene glycol to be provided per liter of space surrounding the polyester material can be calculated from the density of PET of 1.36 g/cc as 0.00181 mol/l or 0.112 g/l. To maintain the initial IV, which is frequently used to represent the average molecular weight, 0.112g/l of ethylene glycol is provided in the area surrounding the polyester material. In this way the concentration of the ethylene glycol is the same inside the polyester material as it is outside the polyester material. Of course, if the molecular weight is intentionally being changed by the process of the present invention, the equilibrium amount provided will be greater or lesser than the initial equilibrium concentration within the polyester material. Again, the equilibrium amount provided is calculated based on the desired average molecular weight or IV.

The present invention can be used to treat any thermoplastic polyester. Crystallizable polyesters are preferred, especially, polyethylene terephthalate, polybutylene terephthalate, and polyethylene naphthalate. Preferably the polyester is post-consumer polyester that is to be recycled. Such polyesters typically have hydroxyl end groups, although carboxyl, methyl, and even vinyl are also possible.

The "contaminants" referred to in the present application mean substances contained in a polyester material that are not polyester polymerization reactants, catalysts, or products. Typical contaminants would include detergents and soaps, hydrocarbons such as gasoline, organic solvents, and nitrogenous compounds.

The "inert gas" or "inert liquid" used in the present invention is one which does not cause any appreciable undesired chemical reaction. Specifically, the inert gas does not induce the generation of polyester reversible side-products or cause polyester polymerization. Suitable inert gases include the noble gases, especially argon, as well as nitrogen and carbon dioxide. The inert gas can be a mixture of gases and may include small amounts of oxygen such as up to 8%. However, the oxygen content must be carefully determined so as to prevent the gas from becoming non-inert. Preferably, no oxygen is present in the inert gas. The inert liquid likewise does not cause any polymerization or depolymerization reactions and does not dissolve the polymer. Suitable inert liquids include biphenyl compounds and diphenyl ether compounds.

The polyester reversible side-product can be provided around the polyester material by any suitable means. The important feature is that the polyester reversible side-product is present during the inert gas stream treatment. Typically, the polyester reversible side-product is provided in vapor form.

The invention will now be further described with reference to the drawings where like numerals have like meaning. However, the drawings are only diagrammatical and should not be construed as limiting the scope of the present invention.

Figure 1:
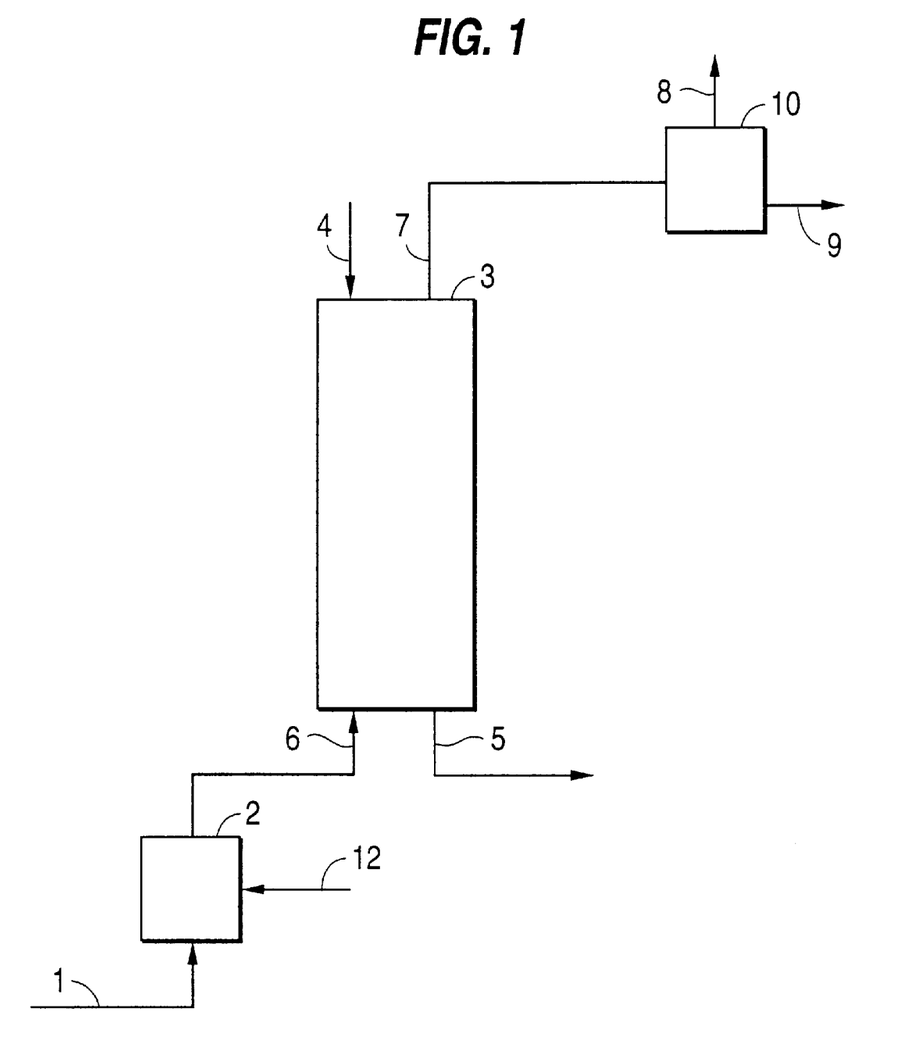
FIG. 1 shows an apparatus suitable for carrying out the present invention.

In the embodiment shown in FIG. 1, a source for an inert gas stream 1 is directed to a polyester reversible side-product mixing box 2. The mixing box contains, for example, liquid ethylene glycol, supplied by conduit 12. The inert gas stream bubbles up through the liquid layer to mix the ethylene glycol into the gas. The amount of ethylene glycol introduced into the inert gas stream can be controlled by the temperature of the mixing box by conventional means. The mixed ethylene glycol will normally be in the gas phase, but may be fully or partially present as fine liquid drops entrained in the inert gas. After the mixing box 2, the gas stream is heated to the temperature within the treatment chamber 3. This heating occurs either before or in Chamber 3. The mixed stream 6 comprising the inert gas and ethylene glycol enters treatment chamber 3 which contains chips or flakes of contaminated polyester material.

Figure 2:
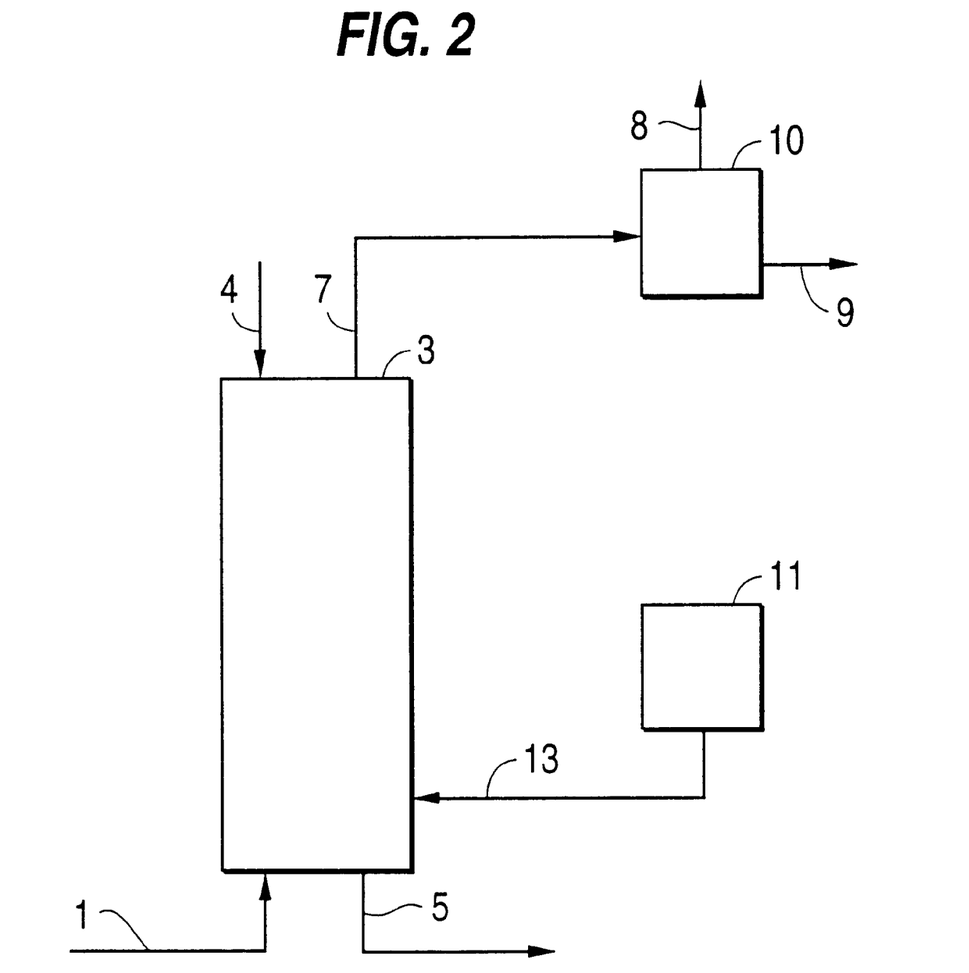
FIG. 2 shows an apparatus suitable for carrying out the present invention.

Another embodiment for providing the polyester reversible side-product is shown in FIG. 2 wherein the inert gas 1 is supplied directly to the chamber 3 and polyester reversible side-product 13 is separately provided from storage tank 11. The polyester reversible side-product such as ethylene glycol is normally provided in the gas phase to chamber 3, although fine liquid droplets are also contemplated as a suitable way for introducing the polyester reversible side-product into the chamber 3. This embodiment has the advantage of being able to more easily provide the polyester reversible side-product independently of the amount of inert gas.

The contaminated polyester material normally forms a packed bed within the chamber 3 and is added to the chamber through conduit 4. The addition can be continuous, semi-continuous, or batch. For continuous and semi-continuous operations, the countercurrent flow scheme shown in FIGS. 1 and 2 is preferred. The contaminated polyester is in the form of chips or flakes as is customary in the recycling process. The size and shape of the contaminated polyester material is not particularly limited as both small and large size materials can be successfully treated by the present invention. This is an advantage over some treatment schemes which are dependent on the use of finely ground materials. Typically the contaminated polyester material is processed to a size having a total surface area of from 0.1 to 20 $cm^2$, preferably 0.5 to 10 $cm^2$, per chip or flake.

Once in the chamber 3, the polyester material is heated to a temperature of 150° C. or more, typically from 150 to 250° C., preferably from 180 to 225° C. The temperature selected affects the rate of contaminant removal with higher temperatures having greater removal efficiencies. However, too high a temperature will soften the polyester material to the extent that handling becomes difficult.

The polyester material is then treated with inert gas while in the presence of an equilibrium amount of polyester reversible side-product. The inert gas passes over the polyester material in that it passes through and around the packed bed of polyester material. While the inert gas is passing over the polyester material, the presence of an equilibrium amount of polyester reversible side-product is maintained within the chamber 3. The amount of polyester reversible side-product present in the chamber 3 can be measured as the partial pressure by conventional means, not shown, such as dew point measurement, gas chromatograph analysis, or infrared analysis. By a suitable feed back control loop, not shown, the equilibrium amount of polyester reversible side-product can be maintained within the chamber 3 through appropriate adjustment of the polyester reversible side-product addition amount, if desired.

The residence time of the polyester material in chamber 3, that is the treatment duration, is not specifically limited so long as some significant portion of the contaminants are removed, generally at least 50%. The residence time will generally range from 2 minutes to 20 hours, depending on the conditions used. One of the advantages of the present invention is that molecular weight is not increasing uncontrollably as a function of time. Whereas the prior art method was essentially a race to strip the contaminants before too much molecular weight increase occurred, the present invention controls the molecular weight so that the final molecular weight of the polyester is essentially independent of time. Thus, the present invention can carry out long treatments if desired without risking large, uncontrolled molecular weight increases. Such conditions could insure higher contaminant removal efficiency. Alternatively, if the molecular weight is to be modified, longer treatment times could also be used to insure that the new forced equilibrium amounts of polyester reversible side-product in the treated polyester material have been achieved.

From a production efficiency point of view, the residence time will generally be in the range of 0.1 to 10 hours. However, longer residence times for any of the reasons discussed above would include residence times of up to 100 hours or more. Residence times of 30 hours or more and 50 hours or more are also contemplated.

The residence time is also affected by the flow rate of gas 6 or 1 in FIGS. 1 and 2, respectively. A higher flow rate can reduce the required residence time necessary to obtain a certain purity level. Generally, the flow rates are not particularly limited, but should be at least high enough to avoid a build up of contaminants in chamber 3.

The cleaned polyester flake is removed from the chamber 3 via conduit 5. The contaminant-containing gas stream leaves via conduit 7 and has the ethylene glycol stripped therefrom in stripper 10. The recovered ethylene glycol 9 can be recycled back through conduit 12, not shown. Similarly, the resulting inert gas stream 8 can be treated by means not shown to remove the contaminants and then recycled, not shown, to become the source 1.

By similar processes, a inert liquid can be used instead of an inert gas. Moreover, the inert fluid can be omitted entirely, wherein only the polyester reversible side-product is passed over the polyester material.

The invention having been thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A process for removing contaminants, which comprises removing contaminants from a solid contaminant-containing polyester material at a temperature in the range of from 150° C. to 250° C. in the presence of an equilibrium amount of a gaseous polyester reversible side-production of ethylene glycol, said polyester material being solid throughout said process, wherein the molecular weight of the polyester is adjusted to a preselected molecular weight in the range of 0.5 to 1.2 I.V. by controlling the concentration of said gaseous ethylene glycol that is in contact with the polyester, and wherein said gaseous polyester reversible side-product of ethylene glycol is not a contaminant.

2. The process according to claim 1, wherein said polyester reversible side-product is provided in an inert gas stream.

3. The process according to claim 2, wherein said polyester reversible side-product is provided independently from said inert gas stream.

4. The process according to claim 3, wherein said polyester reversible side-product is provided in an atmosphere around said polyester material.

5. The process according to claim 1, wherein said equilibrium amount of said polyester reversible side-product is substantially equal to the original equilibrium amount of polyester reversible side-products present in said contaminated polyester material so as to maintain the molecular weight of the polyester constant.

6. The process according to claim 1, wherein said equilibrium amount of said polyester reversible side-product is greater than the original equilibrium amount of polyester reversible side-products present in said contaminated polyester material so as to increase the molecular weight of the polyester.

7. The process according to claim 1, wherein said equilibrium amount of said polyester reversible side-product is less than the original equilibrium amount of polyester reversible side-products present in said contaminated polyester material so as to reduce the molecular weight of the polyester.

8. The process according to claim 1, wherein said polyester material is selected from the group consisting of polyethylene terephthalate, polyethylene naphthalate, and polybutylene terephthalate.

9. The process according to claim 1, wherein said polyester material is in the form of flakes.

10. The process according to claim 2, wherein said inert gas is selected from the group consisting of argon, carbon dioxide, nitrogen, and mixtures thereof.

11. The process according to claim 1, wherein said temperature is in the range of from 180 to 220° C.

12. A process for removing contaminants, which comprises:
(a) adding an effective molecular weight controlling amount of a polyester gaseous reversible side-product of ethylene glycol to a vessel which contains solid contaminated polyester material; and
(b) passing an inert fluid over said contaminated polyester material contained in said vessel at a temperature in the range of from 150 to 250° C. to remove contaminants from said polyester material, said polyester material being solid throughout said process, wherein the molecular weight of the polyester is adjusted to a preselected molecular weight in the range of 0.5 to 1.2

I.V. by controlling the concentration of said gaseous ethylene glycol that is in contact with the polyester, and wherein said gaseous polyester reversible side-product of ethylene glycol is not a contaminant.

13. The process according to claim 12, wherein said polyester reversible side-product and said inert fluid are supplied simultaneously as a mixture to said vessel.

14. The process according to claim 12, wherein said polyester reversible side-product is added in an amount such that an initial molecular weight of the contaminated polyester material remains substantially unchanged throughout the process.

15. The process according to claim 1, wherein the contaminant is detergent, soap, hydrocarbon, nitrogenous compound or combinations thereof.

16. A process for removing contaminants which comprises passing inert fluid over a solid contaminant-containing polyester material at a temperature in the range of from 150° to 250° C. in the presence of an equilibrium amount of a gaseous polyester reversible side-product of ethylene glycol to remove contaminants from said polyester material, said polyester material being solid throughout said process, wherein the molecular weight of the polyester is adjusted to a preselected molecular weight in the range of 0.5 to 1.2 I.V. by controlling the concentration of said gaseous ethylene glycol that is in contact with the polyester, and wherein said gaseous polyester reversible side-product of ethylene glycol is not a contaminant.

17. The process according to claim 1, wherein the pressure is from ambient pressure to about one atmosphere.

18. A process for removing contaminants, which comprises removing contaminants from a solid contaminant-containing polyester material while controlling molecular weight to a predetermined value, at a temperature in the range of from 150° C. TO 250° C. in the presence of an equilibrium amount of gaseous ethylene glycol, said polyester material being solid throughout said process, wherein the molecular weight of the polyester is adjusted to a preselected molecular weight in the range of 0.5 to 1.2 I.V. by controlling the concentration of said gaseous ethylene glycol that is in contact with the polyester, and wherein said gaseous polyester reversible side-product of ethylene glycol is not a contaminant.

19. A process for removing contaminants, which comprises removing contaminants from a solid contaminant-containing polyester material while maintaining the molecular weight of said polyester material, at a temperature in the range of from 150° C. to 250° C. in the presence of an equilibrium amount of gaseous ethylene glycol, said polyester material being solid throughout said process, wherein the pressure during the process is not in the supercritical state and the molecular weight of the polyester is adjusted to a preselected molecular weight in the range of 0.5 to 1.2 I.V. by controlling the concentration of said gaseous ethylene glycol that is in contact with the polyester, and wherein said gaseous polyester reversible side-product of ethylene glycol is not a contaminant.

20. The process according to claim 18, wherein the process proceeds at a pressure in the range of ambient pressure to about one atmosphere.

21. The process according to claim 18, wherein the adjustment of the average molecular weight, either up or down, is not more than 0.15 IV.

22. The process according to claim 18, wherein if a mixture of polyester material are used, each having a different average molecular weight, the equilibrium amount of the polyester reversible side-product may be selected such that one of the polyester materials is substantially increasing its average molecular weight while another is substantially decreasing its average molecular weight.

23. The process of claim 1, wherein the molecular weight is the range of 0.5 to 0.84 I.V.

24. The process of claim 12, wherein the molecular weight is the range of 0.5 to 1.84 I.V.

25. The process of claim 16, wherein the molecular weight is the range of 0.5 to 0.84 I.V.

26. A process for removing contaminants from contaminant containing polyesters, which comprises removing the contaminants from solid contaminant-containing polyester material at a temperature in the range of from 180° C. to 225° C. in the presence of an equilibrium amount of a gaseous polyester reversible side-product of ethylene glycol, wherein (a) said polyester material is maintained as a solid throughout said process, and (b) the molecular weight of said polyester material is adjusted to a preselected molecular weight in the range of 0.5 to 1.2 I.V. by simultaneously controlling the temperature and the concentration of gaseous ethylene glycol that is in contact with the solid polyester material, and wherein said gaseous polyester reversible side-product of ethylene glycol is not a contaminant.

27. The process according to claim 26, wherein the molecular weight of the polyester material is controlled in the range of 0.72 to 0.84 IV.

28. The process for removing contaminants according to claim 26, and additionally which comprises:
  (a) adding an effective molecular weight controlling amount of the polyester gaseous reversible side-product to a vessel which contains solid contaminated polyester material; and
  (b) passing an inert fluid over said contaminated polyester material contained in said vessel at a temperature in the range of from 180° C. to 225° C. to remove contaminants from said polyester material, and maintaining said polyester material as a solid throughout said process; and
  (c) controlling the concentration of said gaseous ethylene glycol that is in contact with the solid polyester material whereby the molecular weight of the polyester is adjusted to a preselected molecular weight in the range of 0.5 to 1.2 I.V.

29. The process according to claim 28, wherein the molecular weight of the polyester material is adjusted to a preselected molecular weight in the range of 0.72 to 0.84 I.V.

30. The process for removing contaminants according to claim 26, which comprises (a) passing an inert fluid over a solid contaminant-containing polyester material at a temperature in the range of from 180° C. to 225° C. in the presence of an equilibrium amount of a gaseous polyester reversible side-product consisting essentially of ethylene glycol to remove the contaminants from said polyester material; (b) and maintaining said polyester material as a solid throughout said process; and (c) controlling the concentration of said gaseous ethylene glycol that is in contact with the polyester whereby the molecular weight of the polyester is adjusted to a preselected molecular weight in the range of 0.5 to 1.2 I.V.

31. The process according to claim 30, wherein the molecular weight of the polyester material is adjusted to a preselected molecular weight in the range of 0.72 to 0.84 I.V.

32. The process according to claim 26 which comprises removing contaminants from a solid contaminant-containing polyester material while controlling molecular weight to a predetermined value; and maintaining the process at a temperature in the range of from 180° C. to 225° C. in the presence of an equilibrium amount of gaseous ethylene glycol, wherein said polyester material is maintained as a solid throughout said process, and wherein the molecular weight of the polyester is adjusted to a preselected molecular weight in the range of 0.5 to 1.2 I.V. by controlling the concentration of said gaseous ethylene glycol that is in contact with the polyester.

33. The process according to claim 32, wherein the pressure during the process is kept outside the supercritical state.

34. The process according to claim 32, wherein the molecular weight of the polyester is adjusted to a preselected molecular weight in the range of 0.72 to 0.84 I.V. by controlling the concentration of said gaseous ethylene glycol that is in contact with the polyester.

* * * * *

UNITED STATES PATENT AND TRADEMARK OFFICE
CERTIFICATE OF CORRECTION

PATENT NO. : 6,103,774
DATED : August 15, 2000
INVENTOR(S) : Mark RULE

It is certified that error appears in the above-identified patent and that said Letters Patent is hereby corrected as shown below:

CLAIM 18, Col. 9, L. 36, "TO" should read --to--.

CLAIM 22, Col. 10, L. 2, "are used" should read --is used--.

CLAIM 23, Col. 10, L. 9, before "the range" insert --in--.

CLAIM 24, Col. 10, L. 11, before "the range" insert --in--.

CLAIM 25, Col. 10, L. 13, before "the range", insert --in--.

Signed and Sealed this

First Day of May, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 6,103,774 Page 1 of 1
DATED : August 15, 2000
INVENTOR(S) : Mark Rule It is certified that error appears in the above-identified patent and that said Letters Patent is hereby corrected as shown below:

Column 8,
Line 36, change "increase" to -- decrease --.
Line 42, change "reduce" to -- increase --.

Signed and Sealed this

Sixteenth Day of September, 2003

JAMES E. ROGAN
*Director of the United States Patent and Trademark Office*